(12) United States Patent
Takeyama et al.

(10) Patent No.: US 11,967,927 B2
(45) Date of Patent: Apr. 23, 2024

(54) SOLAR POWER GENERATION SYSTEM

(71) Applicant: OMRON Corporation, Kyoto (JP)

(72) Inventors: Takahiro Takeyama, Kyoto (JP); Ryo Ogura, Kyoto (JP); Jeongho Baik, Kyoto (JP); Jun Nakaichi, Kyoto (JP); Tsuyoshi Uchida, Hoffman Estates, IL (US); Tomoko Endo, Hoffman Estates, IL (US); Erica Martin, Hoffman Estates, IL (US)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/107,016

(22) Filed: Feb. 8, 2023

(65) Prior Publication Data

US 2023/0268880 A1    Aug. 24, 2023

(30) Foreign Application Priority Data

Feb. 22, 2022 (JP) ................................. 2022-026168

(51) Int. Cl.
*H02S 40/36* (2014.01)
*H02H 7/20* (2006.01)
*H02M 3/335* (2006.01)
*H02S 40/32* (2014.01)
*H02S 50/00* (2014.01)

(52) U.S. Cl.
CPC ............. *H02S 40/36* (2014.12); *H02H 7/20* (2013.01); *H02M 3/335* (2013.01); *H02S 40/32* (2014.12); *H02S 50/00* (2013.01)

(58) Field of Classification Search
CPC .......... H02S 40/36; H02S 40/32; H02S 50/00; H02H 7/20; H02M 3/335; H02M 3/33523; H02M 7/48; Y02E 10/50
See application file for complete search history.

(56) References Cited

U.S. PATENT DOCUMENTS

| | | | |
|---|---|---|---|
| 2016/0049537 A1* | 2/2016 | Ueda ................... | H01L 31/0504 136/244 |
| 2017/0271875 A1* | 9/2017 | Narla ...................... | H02S 40/38 |
| 2019/0027617 A1* | 1/2019 | Varlan ..................... | H02S 50/10 |
| 2021/0281065 A1* | 9/2021 | Zhu ........................ | H02S 40/32 |

FOREIGN PATENT DOCUMENTS

| | | |
|---|---|---|
| JP | 2012-511299 A | 5/2012 |
| WO | 2010/065043 A1 | 6/2010 |

* cited by examiner

*Primary Examiner* — Michael Y Sun
(74) *Attorney, Agent, or Firm* — SHINJYU GLOBAL IP

(57) ABSTRACT

A solar power generation system includes a string, an inverter a first shut-off device, and a second shut-off device. The string includes a plurality of solar cell module groups connected in series with each other. Each of the solar cell module groups includes one or a plurality of solar cell modules connected in series. The first shut-off device cuts off a connection between the plurality of solar cell module groups connected to a first electric path in response to a first control signal from the inverter. The second shut-off device is connected to the first shut-off device in a two-way communicable manner, is driven by an electrical power supplied from the first shut-off device, and cuts off a connection between the plurality of solar cell module groups connected to a second electric path in response to a second control signal from the first shut-off device.

17 Claims, 9 Drawing Sheets

| OPERATION MODE | | WEATHER/ SUNSHINE | POWER GENERATION | CONTROL SIGNAL | RELAY OPERATION MODE |
|---|---|---|---|---|---|
| START | | ☼ | YES | ON | ON |
| ACTIVE | | ☼ | YES | ON | ON |
| SAFETY NORMAL SHUT-OFF | | ☾☁ | NO | ON | OFF |
| | | ☼☁ | UNSTABLE | ON | ON/OFF |
| EMERGENCY SAFETY SHUT-OFF | | ☼ | YES | OFF | OFF |

FIG. 5

SOLAR POWER GENERATION SYSTEM

CROSS-REFERENCE TO RELATED APPLICATION

This application claims priority to Japanese Patent Application No. 2022-026168, filed Feb. 22, 2022. The contents of that application are incorporated by reference herein in their entirety.

FIELD

The present invention relates to a solar power generation system.

BACKGROUND

In the United States, for the purpose of protecting firefighters from electric shock in an emergency such as a fire, the introduction, into a solar power generation system, of a so-called rapid shutdown function for immediately stopping the power generation by a solar power generation system in an emergency is mandated by National Electrical Code (NEC). For example, Published Japanese Translation No. 2012-511299 of the PCT International Publication discloses a solar power generation system in which the output of power from solar cell modules to an inverter is stopped according to the operating state of the inverter.

SUMMARY

In a solar power generation system, in order to further improve the safety of firefighters in the event of a fire, for example, preferably a shut-off device having the rapid shutdown function is installed for each solar cell module. However, the shut-off device for each solar cell module increases the installation cost of the shut-off devices.

An object of the present invention is to provide a solar power generation system that achieves both the decrease in installation cost of shut-off devices and the improvement of stability of the solar power generation system.

A solar power generation system according to one aspect of the present invention includes a string, an inverter, a first shut-off device, and a second shut-off device. The string includes a plurality of solar cell module groups connected in series with each other. The plurality of solar cell module groups each include one or a plurality of solar cell modules connected in series. The inverter is connected to the string for converting DC power output from the solar cell modules to AC power. The first shut-off device is connected to a first electric path connecting between the plurality of solar cell module groups. The second shut-off device is connected to the first shut-off device in a two-way communicable manner, is connected to a second electric path connecting between a plurality of solar cell module groups different from the plurality of solar cell module groups connected to the first electric path. The plurality of solar cell module groups in the string each have an open circuit voltage equal to or less than a predetermined open circuit voltage. The first shut-off device is connected to a power line connected to the second shut-off device and configured to cut off a connection between the plurality of solar cell module groups connected to the first electric path in response to a first control signal from the inverter. The second shut-off device is driven by an electrical power supplied from the first shut-off device via the power line and configured to cut off a connection between the solar cell module groups connected to the second electric path in response to a second control signal output from the first shut-off device.

In this solar power generation system, the first shut-off device and the second shut-off device are in a master-slave relationship, and the second shut-off device cuts off the connection between the plurality of solar cell module groups in response to the second control signal output from the first shut-off device. Further, the second shut-off device is supplied with an electrical power from the first shut-off device. As such, the configuration of the second shut-off device can be simplified, reducing the installation cost of the second shut-off device. In addition, since each of the plurality of solar cell module groups has an open-circuit voltage equal to or less than a predetermined open-circuit voltage, a highly safe solar power generation system can be provided. Further, since the second shut-off device is connected to the first shut-off device in a two-way communicable manner, for example, a state of the second shut-off device can be monitored by the first shut-off device.

The first shut-off device may be configured to monitor the second shut-off device based on a second state signal output from the second shut-off device. In this case, the first shut-off device can monitor whether the second shut-off device is operating normally.

When the first shut-off device determines that the second shut-off device is abnormal depending on the second state signal output from the second shut-off device, the first shut-off device may output an abnormal signal. In this case, the first shut-off device can notify the inverter, the user, or the like of an abnormality in the second shut-off device.

When the first shut-off device detects that the second state signal output from the second shut-off device is stopped, the first shut-off device may determine that the second shut-off device is abnormal. In this case, it is possible to detect the abnormality in the second shut-off device with a simple configuration.

The second shut-off device may be connected to the first shut-off device with a single communication line. In this case, the second shut-off device can be connected to the first shut-off device in a two-way communicable manner with a simple and inexpensive configuration.

The second shut-off device may include an open-close unit. The open-close unit may be configured to open and close the connection between the solar cell module groups connected to the second electric path. The second state signal output from the second shut-off device may include information about an opened or closed state of the open-close unit. In this case, for example, the first shut-off device can monitor whether the open-close unit is operating normally.

The inverter may be configured to monitor the first shut-off device based on a first state signal output from the first shut-off device. In this case, the inverter can monitor whether the first shut-off device is operating normally.

When the inverter determines that the first shut-off device is abnormal depending on the first state signal, the inverter may output an abnormal signal. In this case, the inverter can notify the user or the like of an abnormality in the first shut-off device.

The first shut-off device may cut off the connection between the plurality of solar cell module groups connected to the first electric path in response to the first control signal from the inverter, and then output the second control signal to the second shut-off device. In this case, the voltage applied to the second shut-off device can be decreased. With the configuration, the cost of the second shut-off device can be reduced.

The first shut-off device may output the second control signal to the second shut-off device by a communication system different from power line communication. In this case, the communication from the first shut-off device to the second shut-off device can be stabilized.

The plurality of solar cell module groups in the string may each have an open circuit voltage of 165 V or less. In this case, a safer solar power generation system can be provided.

The plurality of solar cell module groups in the string may include a first group. The first shut-off device may be driven by an electrical power generated by one or a plurality of solar cell modules connected in series belonging to the first group. In this case, when the first shut-off device is disposed in an existing solar power generation system, additional wiring for connecting the inverter and the first shut-off device can be omitted. Thus, the installation cost of the first shut-off device can be reduced. Further, the drive voltage range of the first shut-off device can be narrowed, reducing the manufacturing cost of the first shut-off device.

The inverter may be configured to output the first control signal to the first shut-off device by power line communication. In this case, when the first shut-off device is disposed in an existing solar power generation system, additional wiring for ensuring the communication between the inverter and the first shut-off device can be omitted, which reduces the installation cost of the first shut-off device.

The inverter may be configured to output the first control signal to the first shut-off device by wireless communication. In this case, the first control signal can be output to the first shut-off device by remote control.

At least one of the plurality of solar cell module groups in the string may include a plurality of solar cell modules connected in series. In this case, the plurality of solar cell modules can be cut off by the first shut-off device or the second shut-off device.

The first shut-off device may include a first bypass diode connected in parallel with one of the plurality of solar cell module groups. In this case, it is possible to suppress heat generation and the like of the solar cell module that cannot generate power, and to suppress a decrease in the power generation efficiency of the string.

The second shut-off device includes a second bypass diode connected in parallel with one of the plurality of solar cell module groups. In this case, it is possible to suppress heat generation and the like of the solar cell module that cannot generate power, and to suppress a decrease in the power generation efficiency of the string.

BRIEF DESCRIPTION OF THE DRAWINGS

FIG. 5 is a diagram illustrating an example of the operation modes of a first shut-off device and a second shut-off device.

DETAILED DESCRIPTION

Figure 1:
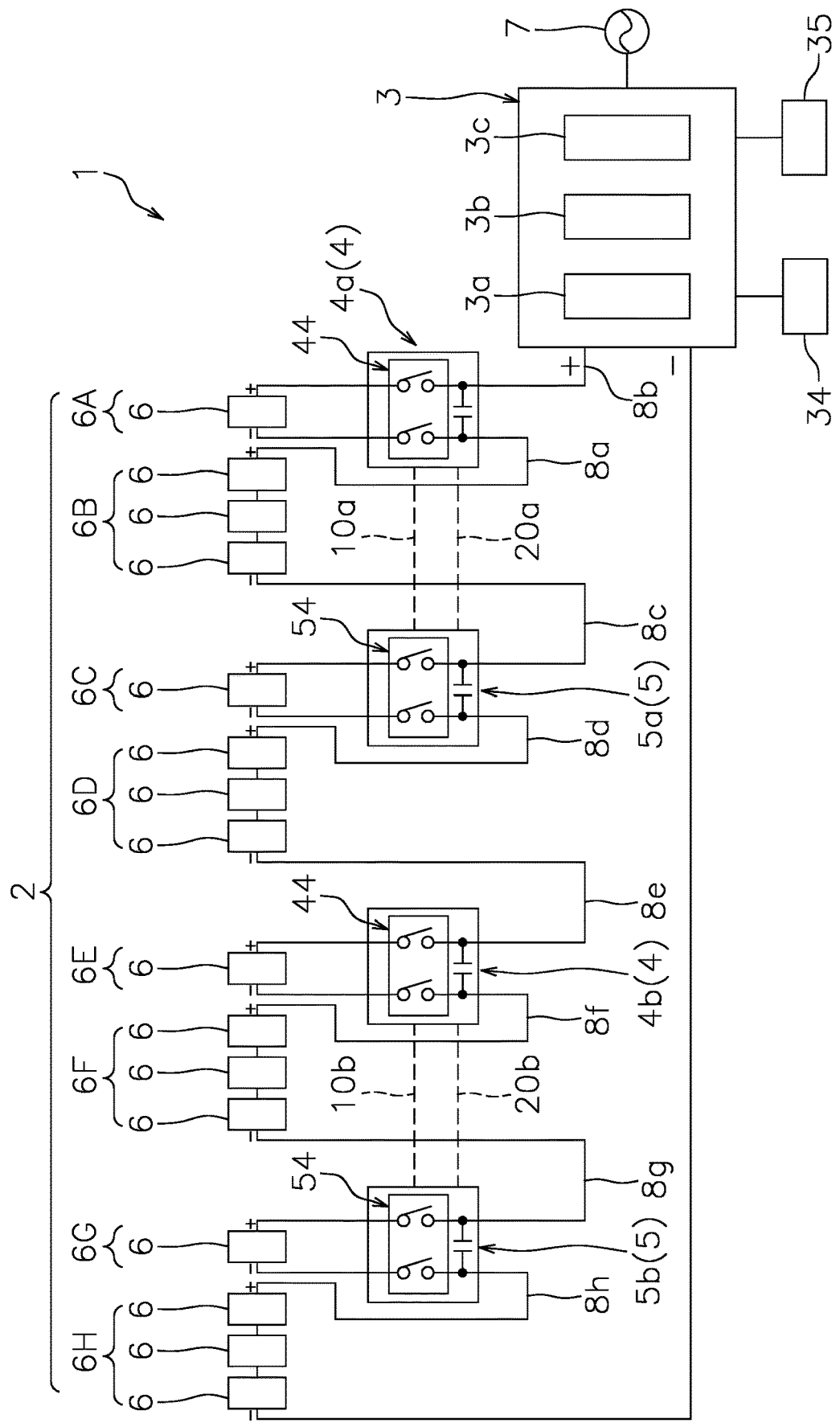
FIG. 1 is a block diagram schematically showing a configuration of a solar power generation system according to an aspect of the present invention.

FIG. 1 is a block diagram schematically showing a configuration of a solar power generation system 1 according to an aspect of the present invention. The solar power generation system 1 includes a string 2, an inverter 3, at least one first shut-off device 4, and at least one second shut-off device 5. In the present embodiment, the at least one first shut-off device 4 includes a plurality of first shut-off devices 4a and 4b, and the at least one second shut-off device 5 includes a plurality of second shut-off devices 5a and 5b.

The string 2 includes a plurality of solar cell module groups 6A to 6H connected in series with each other. The plurality of solar cell module groups 6A to 6H include one or a plurality of solar cell modules 6 connected in series. That is, the string 2 includes a plurality of (16 in the present embodiment) solar cell modules 6 connected in series with each other. Note that the solar power generation system 1 may include a solar cell array in which a plurality of strings 2 are connected in parallel.

The plurality of solar cell module groups 6A to 6H have an open circuit voltage, for each group, equal to or less than a predetermined open circuit voltage. The predetermined open circuit voltage is, for example, 165 V. That is, in the string 2, the plurality of solar cell module groups is divided into groups so that each group has an open circuit voltage of 165 V or less. The solar cell modules 6 have an open circuit voltage of 50 V, for example. Hereinafter, the solar cell module groups 6A to 6H may be referred to as groups 6A to 6H.

Each of the groups 6A, 6C, 6E, and 6G includes one solar cell modules 6. Each of the groups 6B, 6D, 6F, and 6H includes three solar cell modules 6 connected in series with each other. Thus, the open circuit voltage of the groups 6A, 6C, 6E, 6G is 50 V, and the open circuit voltage of the groups 6B, 6D, 6F, 6H is 150 V.

The groups 6A to 6H are arranged in alphabetical order from the group 6A to the group 6H and are connected in series with each other. The groups 6A to 6H each include an anode-side terminal and a cathode-side terminal. The anode-side terminal in each of the groups 6A to 6H corresponds to the anode-side terminal of the solar cell modules 6 closest to the anode of the inverter 3 among the plurality of solar cell modules 6 in the groups 6A to 6H. The cathode in each of the groups 6A to 6H corresponds to the cathode-side terminal of the solar cell modules 6 farthest from the anode of the inverter 3 among the plurality of solar cell modules 6 in the groups 6A to 6H.

For example, the anode-side terminal of the group 6A corresponds to the anode-side terminal of a solar cell module 6 in the group 6A. The anode-side terminal of the group 6A is connected to the anode-side terminal of the inverter 3. The cathode-side terminal of the group 6A corresponds to the cathode-side terminal of a solar cell module 6 in the group 6A. The cathode-side terminal of the group 6A is connected to the anode-side terminal of the group 6B.

For example, the anode-side terminal of the group 6B corresponds to the anode-side terminal of the solar cell module closest to the group 6A among the solar cell modules 6 in the group 6B. The cathode-side terminal of the group 6B corresponds to the cathode-side terminal of the solar cell module farthest from the group 6A among the solar cell modules 6 in the group 6B. The cathode-side terminal of the group 6B is connected to the anode-side terminal of the group 6C.

The cathode-side terminal of the group 6C is connected to the anode-side terminal of the group 6D. The cathode-side terminal of the group 6D is connected to the anode-side terminal of the group 6E. The cathode-side terminal of the group 6E is connected to the anode-side terminal of the group 6F. The cathode-side terminal of the group 6F is connected to the anode-side terminal of the group 6G. The cathode-side terminal of the group 6G is connected to the anode-side terminal of the group 6H. The cathode-side terminal of the group 6H is connected to the cathode-side terminal of the inverter 3.

The solar cell modules 6 receive sunlight to generate power, and output the generated electrical power to the inverter 3. The inverter 3 is connected to the string 2 via a power line. The inverter 3 converts the DC power from the solar cell modules 6 in the string 2 into AC power. The inverter 3 is connected to a power system 7 and supplies the AC power to the commercial power system or load devices.

Specifically, the inverter 3 includes a DC/DC converter 3a, a DC/AC inverter 3b, and a control unit 3c. The DC/DC converter 3a converts the voltage of the electrical power output from the solar cell modules 6 into a predetermined voltage and inputs it to the DC/AC inverter 3b. The DC/AC inverter 3b converts, via the DC/DC converter 3a, the DC power output from the solar cell modules 6 into AC power. The control unit 3c includes a CPU and memory, and controls the DC/DC converter 3a and the DC/AC inverter 3b. The control unit 3c outputs a first control signal to the first shut-off devices 4a and 4b by power line communication.

The first shut-off device 4a and the second shut-off device 5a are in a master-slave relationship. The first shut-off device 4a functions as a master for the second shut-off device 5a, and the second shut-off device 5a functions as a slave for the first shut-off device 4a. That is, the first shut-off device 4a controls the second shut-off device 5a.

Similarly, the first shut-off device 4b and the second shut-off device 5b are in a master-slave relationship. The first shut-off device 4b functions as a master for the second shut-off device 5b, and the second shut-off device 5b functions as a slave for the first shut-off device 4b. That is, the first shut-off device 4b controls the second shut-off device 5b.

In the present embodiment, the first shut-off device 4 and the second shut-off device 5 are in a one-to-one relationship: one second shut-off device is disposed for one first shut-off device.

The first shut-off device 4a is connected to electric paths connecting between the groups 6A to 6H. In the present embodiment, the first shut-off device 4a is connected to an electric path 8a connecting the group 6A and the group 6B and an electric path 8b connecting the inverter 3 and the group 6A. The first shut-off device 4a is connected to the anode-side terminal and the cathode-side terminal of the group A. The first shut-off device 4a cuts off the connection between the group 6A and the group 6B and the connection between the inverter 3 and the group 6A in response to the first control signal from the inverter 3.

The first shut-off device 4a outputs a second control signal to the second shut-off device 5a via a communication line 10a connected to the first shut-off device 4a and the second shut-off device 5a by a communication system different from power line communication. The first shut-off device 4a outputs the second control signal to the second shut-off device 5a, using, for example, serial communication method such as Local Interconnect Network (LIN) communication or Serial Peripheral Interface (SPI) communication. The first shut-off device 4a cuts off the connection between the group 6A and the group 6B and the connection between the inverter 3 and the group 6A, and then outputs the second control signal to the second shut-off device 5a.

The first shut-off device 4a is connected to a power line 20a that is connected to the second shut-off device 5a. The first shut-off device 4a supplies the electrical power for driving the second shut-off device 5a to the second shut-off device 5a via the power line 20a.

Figure 2:
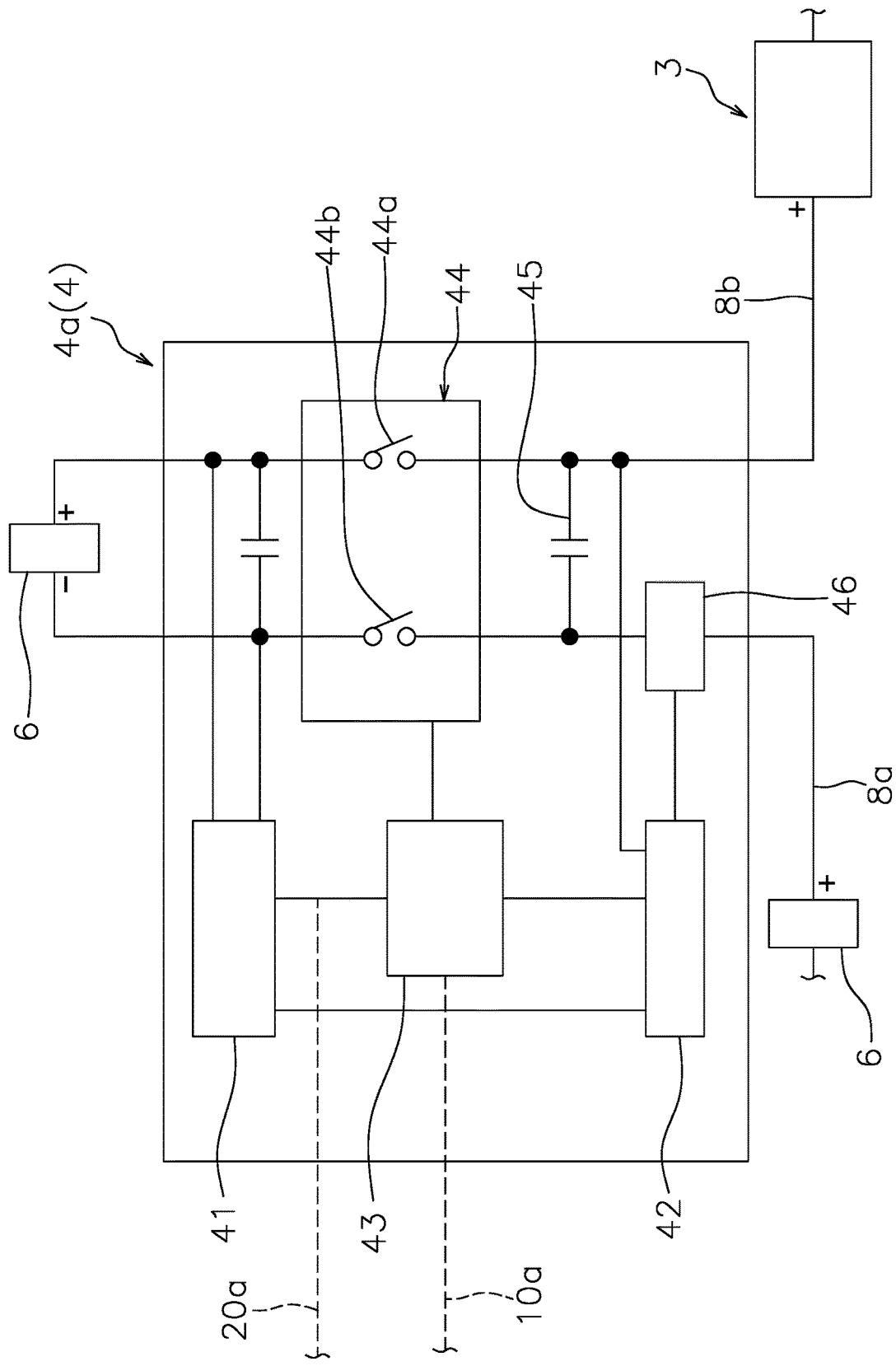
FIG. 2 is a block diagram schematically showing a configuration of a first shut-off device.

FIG. 2 is a block diagram schematically showing a configuration of the first shut-off device 4a. The first shut-off device 4a includes a regulator 41, a signal receiving unit 42, a control unit 43, a relay 44, and a bypass circuit 45.

The regulator 41 uses the electrical power generated by the solar cell module 6 as a power source to generate a drive power for driving the first shut-off device 4a and the second shut-off device 5a, and supplies the drive power in a stable state to the first shut-off device 4a and the second shut-off device 5a. Here, only the power generated by the solar cell module 6 of the group 6A is used to generate the drive power to drive the first shut-off device 4a and second shut-off device 5a.

Figure 3:
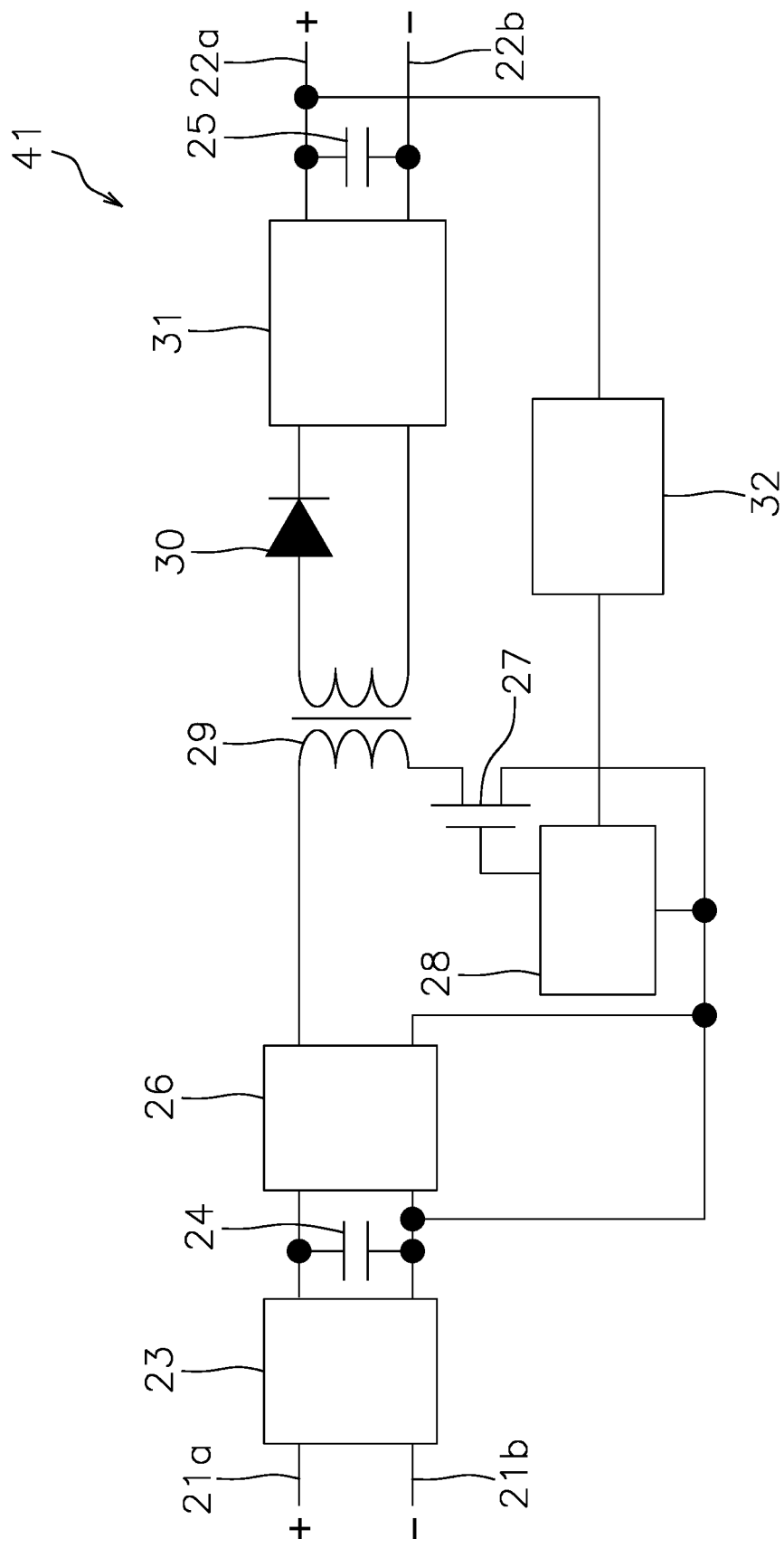
FIG. 3 is a circuit diagram schematically showing a configuration of a regulator.

FIG. 3 is a circuit diagram schematically showing a configuration of the regulator 41. The configuration of the regulator 41 is a well-known configuration, and includes input terminals 21a and 21b, output terminals 22a and 22b, a line filter 23, capacitors 24 and 25, a booster circuit 26, a switching element 27, a control circuit 28, a transformer 29, a diode 30, a DC/DC converter 31, a feedback circuit 32 and the like.

The signal receiving unit 42 receives the first control signal from the control unit 3c of the inverter 3 and outputs the received first control signal to the control unit 43. Specifically, the signal receiving unit 42 receives the first control signal from the control unit 3c of the inverter 3 via a signal detection unit 46 that detects a first control signal from the control unit 3c of the inverter 3.

The control unit 43 includes a CPU and memory. The control unit 43 controls the electric current flowing through the coil in the relay 44 based on the signals output from the signal receiving unit 42, and controls the opening and closing of the contacts of the relay 44. The relay 44 is, for example, a mechanical relay, and is able to open and close a high-voltage direct current.

The control unit 43 outputs the second control signal to the second shut-off device 5a via the communication line 10a by a communication system different from power line communication. The control unit 43 cuts off the connection between the group 6A and the group 6B, and then outputs the second control signal to the second shut-off device 5a. The control unit 43 determines whether or not the connection between the group 6A and the group 6B is cut off by monitoring the voltage between the contacts of the relay 44, for example.

The relay 44 includes a first open-close unit 44a and a second open-close unit 44b. The first open-close unit 44a is disposed in the electric path 8b. The first open-close unit 44a opens and closes the connection between the inverter 3 and the group 6A. The first open-close unit 44a is connected to the anode-side terminal of the group 6A and the anode-side terminal of the inverter 3. The second open-close unit 44b is disposed in the electric path 8a. The second open-close unit 44b opens and closes the connection between the group 6A and the group 6B. The second open-close unit 44b is connected to the cathode-side terminal of the group 6A and the anode-side terminal of the group 6B. In the present embodiment, the first open-close unit 44a may be omitted.

While the first shut-off device 4a is not supplied with the drive power from the regulator 41, the first open-close unit 44a and the second open-close unit 44b are in an open state all the time. Accordingly, while the first shut-off device 4a is not driven, the connection between the inverter 3 and the group 6A and the connection between the group 6A and the group 6B are in a cutoff state.

The bypass circuit 45 is a circuit to allow the signal receiving unit 42 to receive the first control signal from the control unit 3c when the first shut-off device 4a is in the cutoff state. While the electric paths 8a and 8b are in the cutoff state by the first shut-off device 4a, the signal receiving unit 42 is able to receive the first control signal from the control unit 3c via the bypass circuit 45.

The second shut-off device 5a is connected to an electric path connecting between the groups other than the groups 6A and 6B connected to the electric path 8a. In the present embodiment, the second shut-off device 5a is connected to an electric path 8c connecting the group 6B and the group 6C and an electric path 8d connecting the group 6C and the group 6D. The second shut-off device 5a is connected to the anode-side terminal and the cathode-side terminal of the group C. The second shut-off device 5a is connected to the first shut-off device 4a in a two-way communicable manner via the communication line 10a, for example by the serial communication method. The second shut-off device 5a is connected to the first shut-off device 4a with a single communication line. That is, the second shut-off devices 5a is connected to the first shut-off device 4a via one communication line 10a. The second shut-off device 5a cuts off the connection between the group 6B and the group 6C and the connection between the group 6C and the group 6D in response to the second control signal output from the first shut-off device 4a via the communication line 10a.

The second shut-off device 5a is driven by the electrical power supplied from the first shut-off device 4a via the power line 20a. Specifically, the second shut-off device 5a is driven when the drive power generated by the regulator 41 of the first shut-off device 4a is supplied from the first shut-off device 4a to the second shut-off device 5a via the power line 20a.

Figure 4:
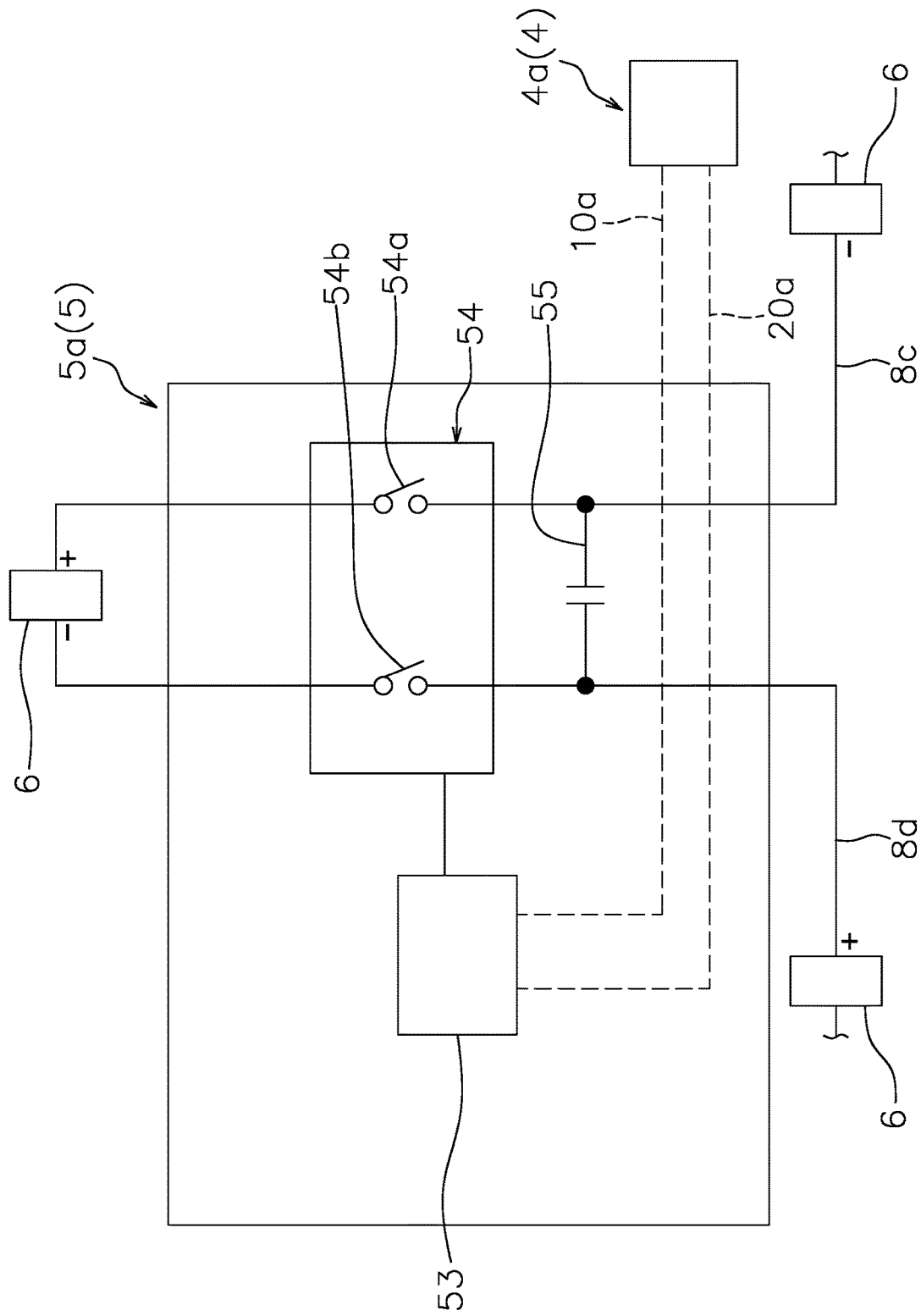
FIG. 4 is a block diagram schematically showing a configuration of a second shut-off device.

FIG. 4 is a block diagram schematically showing a configuration of the second shut-off device 5a. The second shut-off device 5a includes a control unit 53, a relay 54, and a bypass circuit 55.

The control unit 53 includes a CPU and memory. The control unit 53 controls the electric current flowing through the coil of the relay 54 in response to the second control signal from the first shut-off device 4a, and controls the opening and closing of the contacts of the relay 54. The relay 54 is, for example, a mechanical relay and is able to open and close a high-voltage direct current. The relay 54 is an example of an open-close unit. The control unit 53 receives the second control signal from the first shut-off device 4a via a communication interface (not shown) connected to the communication line 10a, and opens the contacts of the relay 54. Specifically, when the control unit 53 receives the second control signal from the first shut-off device 4a, the control unit 53 outputs a command signal to open the contacts of the relay 54 to a relay control unit (not shown). The relay control unit receives the command signal from the control unit 53 and opens the contacts of the relay 54. The control unit 53 feeds the output of the command signal to open the contacts of the relay 54 back to the first shut-off device 4a via the communication line 10a.

The relay 54 includes a third open-close unit 54a and a fourth open-close unit 54b. The third open-close unit 54a is disposed in the electric path 8c. The third open-close unit 54a opens and closes the connection between the group 6B and the group 6C. The third open-close unit 54a is connected to the cathode-side terminal of the group 6B and the anode-side terminal of the group 6C. The fourth open-close unit 54b is disposed in the electric path 8d. The fourth open-close unit 54b opens and closes the connection between the group 6C and the group 6D. The fourth open-close unit 54b is connected to the cathode-side terminal of the group 6C and the anode-side terminal of the group 6D.

While the second shut-off device 5a is not supplied with the drive power from the first shut-off device 4a, the third open-close unit 54a and the fourth open-close unit 54b are in the open state all the time. Accordingly, while the second shut-off device 5a is not driven, the connection between the group 6B and the group 6C and the connection between the group 6C and the group 6D are in the cutoff state.

The bypass circuit 55 is a circuit to allow the signal receiving unit 42 of the first shut-off device 4a to receive the first control signal from the control unit 3c by power line communication when the second shut-off devices 5a are in the cutoff state. The bypass circuit 55 enables continuation of the power line communication.

The first shut-off device 4a monitors the second shut-off device 5a based on a state signal output from the second shut-off device 5a. The first shut-off device 4 outputs an abnormal signal to the inverter 3 when determining that the second shut-off device 5a is abnormal depending on the state signal output from the second shut-off device 5a. When the inverter 3 receives the abnormal signal, the inverter 3 notifies that the second shut-off device 5a is abnormal via a display unit 34 connected to the inverter 3.

The state signal output from the second shut-off device 5a is, for example, feedback to the first shut-off device 4a in response to the control unit 53 outputting the command signal to the relay control unit in response to the second control signal. The first shut-off device 4 determines that the second shut-off device 5a is abnormal when there is no feedback from the second shut-off device 5a.

The first shut-off device 4b has similar configurations as those of the first shut-off device 4a except that the electric path to be connected is different from that in the first shut-off device 4a. The second shut-off device 5b has similar configurations as those of the second shut-off device 5a except that the electric path to be connected is different from that in the second shut-off device 5a. Further, the relationship between the first shut-off device 4b and the second shut-off device 5b is similar to that between the first shut-off device 4a and the second shut-off device 5a described above, and thus will be briefly described.

The first shut-off device 4b is connected to an electric path 8e connecting the group 6D and the group 6E and an electric path 8f connecting the group 6E and the group 6F. The first shut-off device 4b is connected to the anode-side terminal and the cathode-side terminal of the group 6E. The first shut-off device 4b cuts off the connection between the group 6D and the group 6E and the connection between the group 6E and the group 6F in response to the first control signal from the inverter 3.

The first shut-off device 4b outputs a second control signal to the second shut-off device 5b via a communication line 10b connected to the first shut-off device 4b and the second shut-off device 5b by a communication system different from power line communication. The first shut-off device 4b outputs the second control signal to the second shut-off device 5a, using, for example, serial communication method. The first shut-off device 4b cuts off the connection between the group 6D and the group 6E and the connection between the group 6E and the group 6F, and then outputs the second control signal to the second shut-off device 5b. The first shut-off device 4b monitors the second shut-off device 5b based on a state signal output from the second shut-off device 5b.

The first shut-off device 4b is driven by an electrical power generated by the solar cell modules 6 in the group 6E. The first shut-off device 4b is connected to a power line 20b connected to the second shut-off device 5b. The first shut-off device 4b supplies the electrical power for driving the second shut-off device 5b to the second shut-off device 5b via the power line 20b.

The second shut-off device 5b is connected to an electric path 8g connecting the group 6F and the group 6G, and an electric path 8h connecting the group 6G and the group 6H. The second shut-off device 5b is connected to the first shut-off device 4b in a two-way communicable manner via the communication line 10b, for example by the serial communication method. The second shut-off devices 5b is connected to the first shut-off device 4b via one communication line 10b. The second shut-off device 5b cuts off the connection between the group 6F and the group 6G and the connection between the group 6G and the group 6H in response to the second control signal output from the first shut-off device 4b via the communication line 10b.

Next, an example of the operation modes of the first shut-off devices 4a and 4b and the second shut-off devices 5a and 5b will be described with reference to FIG. 5. The operation modes of the first shut-off devices 4a and 4b and the second shut-off devices 5a and 5b include three of a start mode, an active mode, and a safety mode. The safety mode includes a normal shut-off mode and an emergency safety shut-off mode. Thus, the first shut-off devices 4a and 4b and the second shut-off devices 5a and 5b operate in four operation modes: a start mode, an active mode, a normal shut-off mode, and an emergency safety shut-off mode.

The start mode is a mode for when sunlight starts to hit the solar cell modules 6. At this time, the solar cell modules 6 receive sunlight and generate power. Then, the first shut-off devices 4a and 4b are driven by the drive power generated by each of the regulators 41 using the power generated by the solar cell modules 6. When the first shut-off devices 4a and 4b are driven and the control unit 43 receives the first control signal from the control unit 3c of the inverter 3 via the signal receiving unit 42, the control unit 43 controls to close the first open-close unit 44a and the second open-close unit 44b of the relay 44.

Further, the first shut-off devices 4a and 4b supply the drive power generated by the each of regulators 41 to the second shut-off devices 5a and 5b. Accordingly, the second shut-off devices 5a and 5b are driven. When the second shut-off devices 5a and 5b are driven and the control unit 53 receives, from the first shut-off devices 4a and 4b, a command signal different from the second control signal, for example, the control unit 53 closes the third open-close unit 54a and the fourth open-close unit 54b of the relay 54. As a result, the groups 6A to 6H are connected to the strings 2 via the first shut-off devices 4a and 4b and the second shut-off devices 5a and 5b, and the power generated by the solar cell modules 6 is output to the inverter 3.

The active mode is a state in which the solar cell modules 6 receive sunlight during the daytime to generate power, and is substantially the same as the start mode. Thus, in the active mode, the groups 6A to 6H are in connection with each other via the first shut-off devices 4a and 4b and the second shut-off devices 5a and 5b, and the power generated by the solar cell modules 6 is output to the inverter 3.

The normal shut-off mode is a mode for when the solar cell modules 6 are not exposed to sunlight at night or due to the influence of bad weather such as rain. Accordingly, in the normal shut-off mode, the solar cell modules 6 do not generate power, and the first shut-off devices 4a and 4b and the second shut-off devices 5a and 5b are not supplied with the drive power from the solar cell modules 6. Thus, in the normal shut-off mode, the first open-close unit 44a and the second open-close unit 44b of the first shut-off device 4 and the third open-close unit 54a and the fourth open-close unit 54b of the second shut-off devices 5a to 5c are all in the open state. In the present embodiment, electrical power is supplied to the inverter 3 from the AC power supply, and the control signal is always output from the control unit 3c of the inverter 3 except in the emergency safety shut-off mode.

In the normal shut-off mode, for example, when the power generation by the solar cell module 6 of the group 6A is unstable due to the unstable weather or the like, the relay 44 of the first shut-off device 4a and the relay 54 of the second shut-off device 5a are turned into the ON/OFF state depending on the power supplied from the solar cell module 6 of the group 6A.

The emergency safety shut-off mode is a mode in which the electric paths 8a to 8h are cut off so that the power supply from the solar cell modules 6 to the inverter 3 is stopped during the start mode or the active mode. In the present embodiment, as shown in FIG. 1, an operation switch 35 is connected to the inverter 3 and the operation switch 35 is operated during the start mode or the active mode of the first shut-off devices 4a and 4b, the operation mode of the first shut-off devices 4a and 4b are switched to the emergency safety shut-off mode.

Specifically, when the operation switch 35 is operated, the control unit 3c stops the output of the first control signal. When the signal detection unit 46 of the first shut-off device 4a detects the stop of the first control signal of a fixed cycle, the first open-close unit 44a and the second open-close unit 44b of the relay 44 are turned open via the signal receiving unit 42 and the control unit 43. As a result, the connection between the group 6A and the group 6B and the connection between the inverter 3 and the group 6A are cut off, and the output of power from the solar cell modules 6 to the inverter 3 is stopped. At this point of time, the first shut-off device 4a opens the first open-close unit 44a and the second open-close unit 44b of the relay 44, and then outputs the second control signal to the second shut-off device 5a via the communication line 10a. The second shut-off device 5a receives the second control signal from the first shut-off device 4a and then cuts off the connection between the group 6B and the group 6C and the connection between the group 6C and the group 6D. The control unit 53 of the second shut-off device 5a feeds the output of the command signal to the relay control unit to open the contacts of the relay 54 in response to the second control signal from the first shut-off device 4a back to the first shut-off device 4a. The first shut-off device 4a determines that the second shut-off device 5a is abnormal and outputs the abnormal signal to the inverter when there is no feedback from the second shut-off device 5a.

Similarly, when the signal detection unit 46 of the first shut-off device 4b detects the stop of the first control signal of a fixed cycle, the control unit 43 of the first shut-off device 4b opens the first open-close unit 44a and the second open-close unit 44b of the relay 44 of the first shut-off device 4b, and cuts off the connection between the group 6D and the group 6E and the connection between the group 6E and the group 6F. The first shut-off device 4b opens the first open-close unit 44a and the second open-close unit 44b of the first shut-off device 4b, and then outputs the second control signal to the second shut-off device 5b. The second shut-off device 5b receives the second control signal from the first shut-off device 4b and then cuts off the connection between the group 6F and the group 6G and the connection between the group 6G and the group 6H. As a result, all the groups 6A to 6H are separated from each other, so that the open circuit voltage of the string 2 is divided into 165V or less. The control unit 53 of the second shut-off device 5b feeds the output of the command signal to the relay control unit to open the contacts of the relay 54 of the second shut-off device 5b in response to the second control signal from the first shut-off device 4b back to the first shut-off device 4b. The first shut-off device 4b determines that the second shut-off device 5b is abnormal and outputs the abnormal signal to the inverter when there is no feedback from the second shut-off device 5b.

In the solar power generation system 1 of the above configuration, the first shut-off device 4a and the second shut-off device 5a are in a master-slave relationship, and the second shut-off device 5a cuts off the connections between the plurality of solar cell module groups 6B to 6D in response to the second control signal output from the first shut-off device 4a. Further, the second shut-off device 5a is supplied with an electrical power from the first shut-off device 4a. Thus, the second shut-off device 5a can have a simplified configuration, reducing the installation cost of the second shut-off device 5a.

Since the plurality of solar cell module groups 6A to 6H each have an open circuit voltage of 165 V or less, a highly safe solar power generation system can be provided. Further, the second control signal from the first shut-off device 4 is output via the communication line 10a by a communication system different from power line communication, and thereby the signal is unlikely to be affected by noise as compared with the power line communication, and the communication from the first shut-off device 4a to the second shut-off device 5a can be stabilized.

Further, in the solar power generation system 1 of the above configuration, after the connection between the group 6A and the group 6B is cut off by the first shut-off device 4a, the connections between the plurality of solar cell module groups 6B to 6D are cut off by the second shut-off devices 5a. Thus, the voltage applied to the second shut-off device 5a can be decreased, reducing the cost of the second shut-off device 5a.

The first shut-off device 4a is connected to the second shut-off device 5a in a two-way communicable manner and monitors the second shut-off device 5a based on the state signal output from the second shut-off device 5a. Similarly, the first shut-off device 4b is connected to the second shut-off device 5b in a two-way communicable manner and monitors the second shut-off device 5b based on the state signal output from the second shut-off device 5b. As a result, when the operation switch 35 is operated, the first shut-off devices 4a and 4b can detect that the second shut-off devices 5a and 5b are operating normally, so a further highly safe solar power generation system can be provided.

One embodiment of the present invention has been described above, but the present invention is not limited to the above embodiment, and various modifications are possible as long as the modifications are within a scope of the disclosure.

Figure 6:
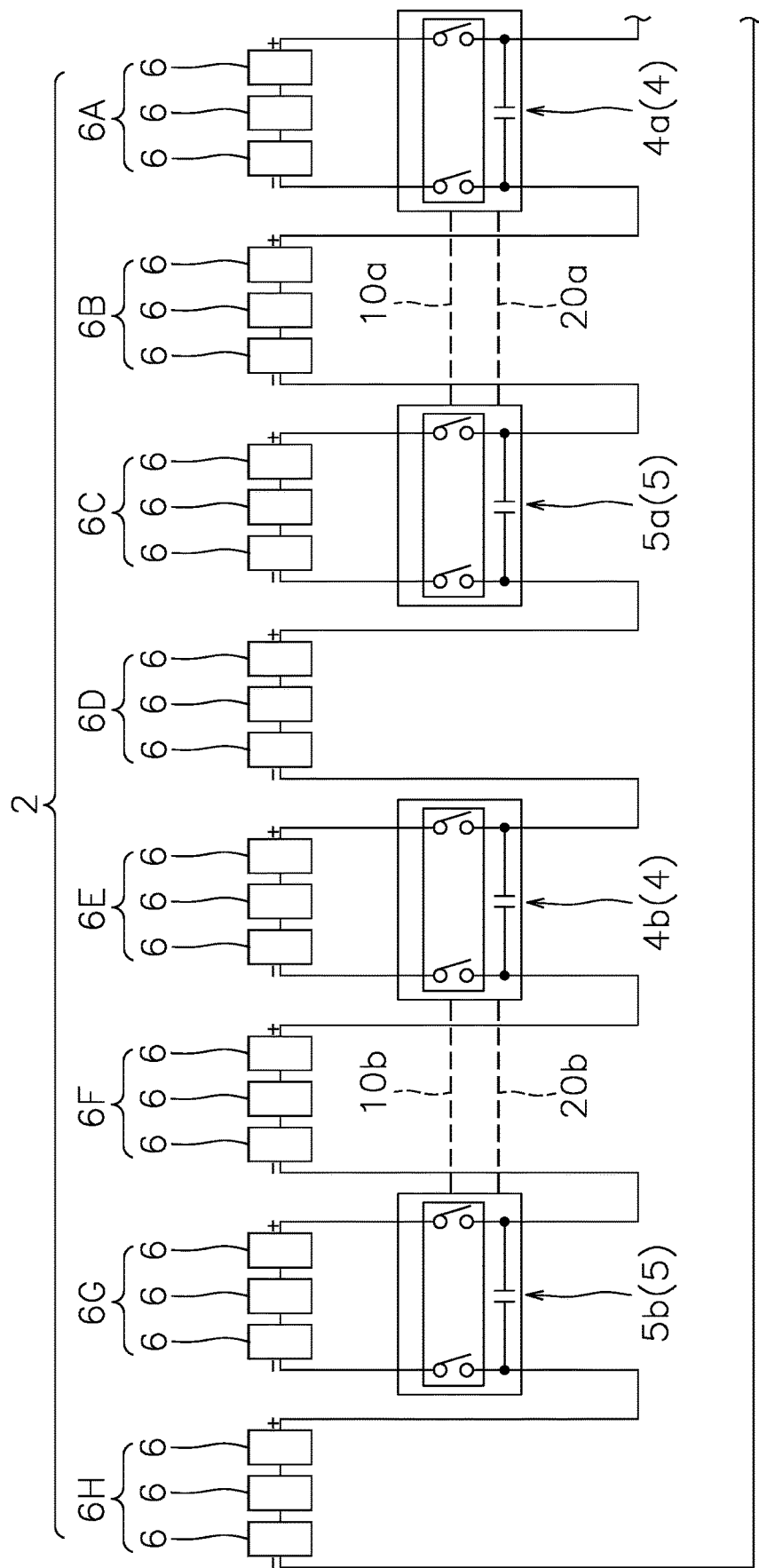
FIG. 6 is a block diagram schematically showing a configuration of a solar power generation system according to another embodiment.

The number of groups of the plurality of solar cell module groups is not limited to the above embodiment. The string 2 may be divided into a plurality of solar cell module groups as long as each group has an open circuit voltage of 165 V or less. For example, as shown in FIG. 6, the plurality of solar cell module groups may be divided by the first shut-off devices 4a and 4b and the second shut-off devices 5a and 5b so that a plurality of solar cell module groups 6A to 6H each include three solar cell modules 6 connected in series. In the example shown in FIG. 6, the first shut-off device 4a is driven by the power generated by the three solar cell modules 6 in the group 6A.

Figure 7:
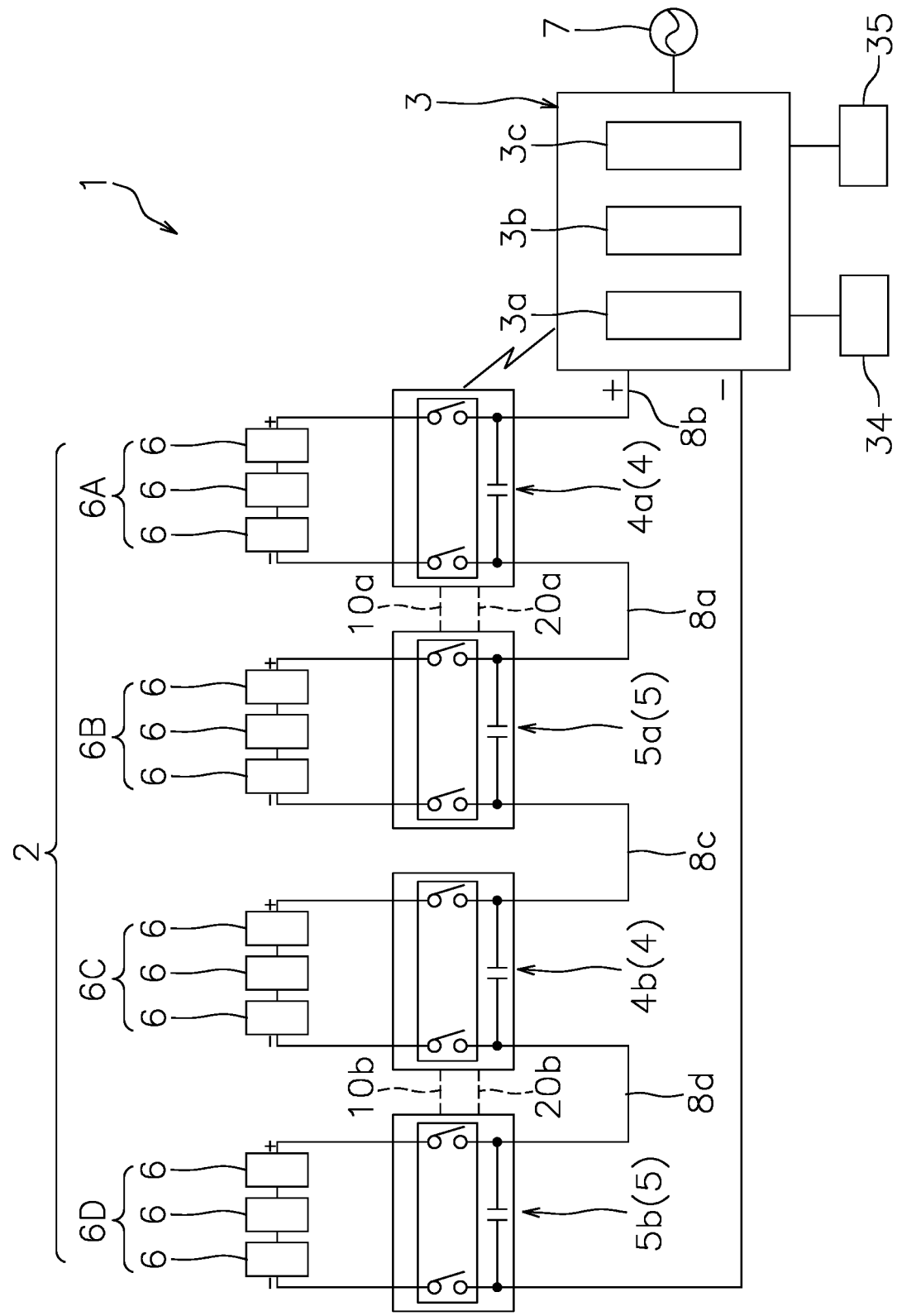
FIG. 7 is a block diagram schematically showing a configuration of a solar power generation system according to another embodiment.

Further, as shown in FIG. 7, one of the first shut-off devices 4a and 4b and the second shut-off devices 5a and 5b may be disposed for each of the plurality of solar cell module groups 6A to 6D.

Figure 8:
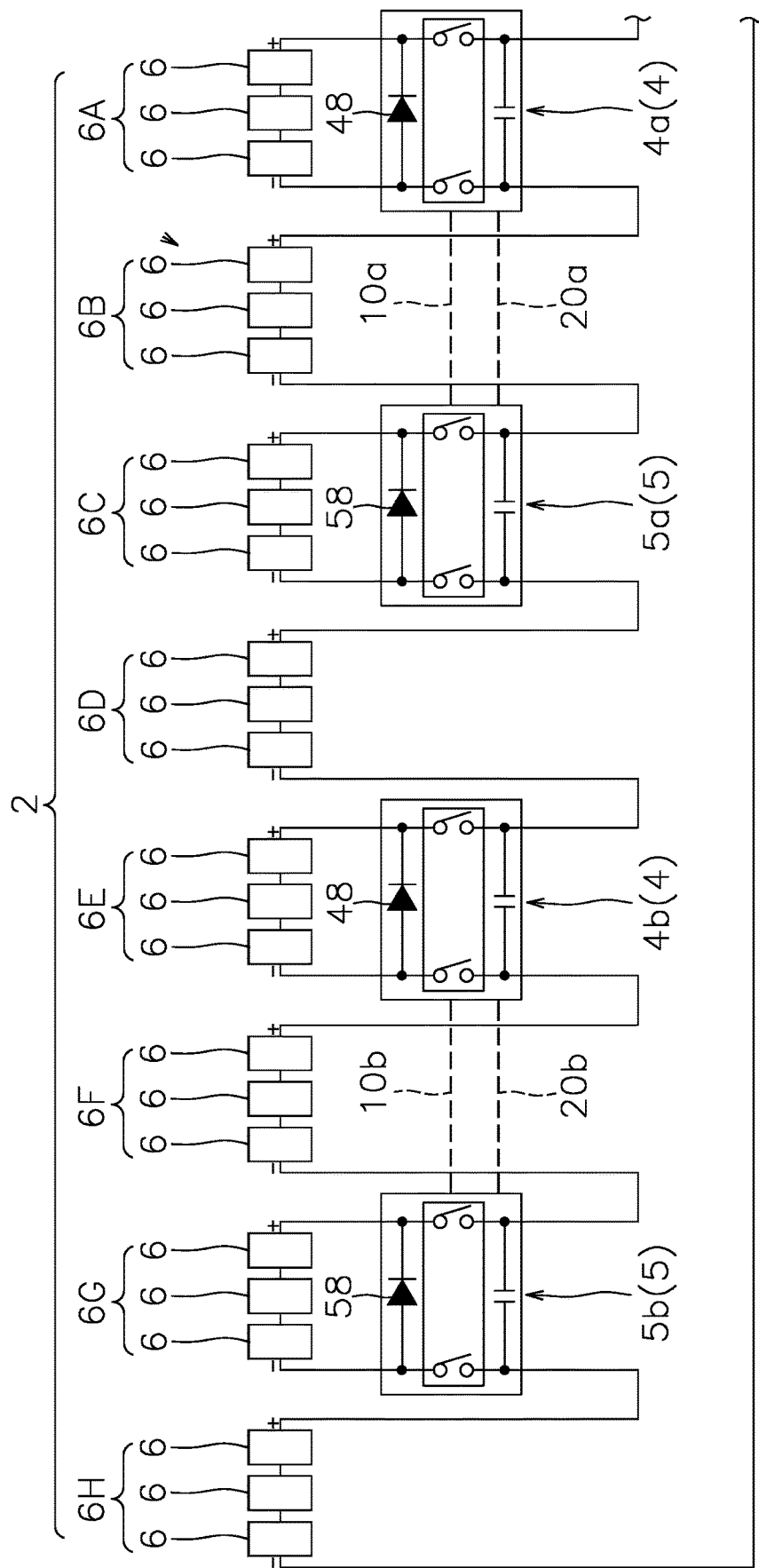
FIG. 8 is a block diagram schematically showing a configuration of a solar power generation system according to another embodiment.

As shown in FIG. 8, the first shut-off devices 4a and 4b may each include bypass diode 48 connected in parallel with any of the plurality of solar cell module groups. In the example shown in FIG. 8, the bypass diode 48 of the first shut-off device 4a is electrically connected in parallel with group 6A. The bypass diode 48 of the first shut-off device 4a includes an anode connected to the cathode-side terminal of group 6A and a cathode connected to the anode-side terminal of group 6A. The bypass diode 48 of the first shut-off device 4b is electrically connected in parallel with group 6F.

Similarly, the second shut-off devices 5a and 5b may each include bypass diode 58 connected in parallel with any of the plurality of solar cell module groups. In the example shown in FIG. 8, the bypass diodes 58 of the second shut-off device 5a is electrically connected in parallel with group 6C, and the bypass diodes 58 of the second shut-off device 5b is electrically connected in parallel with group 6H.

Figure 9:
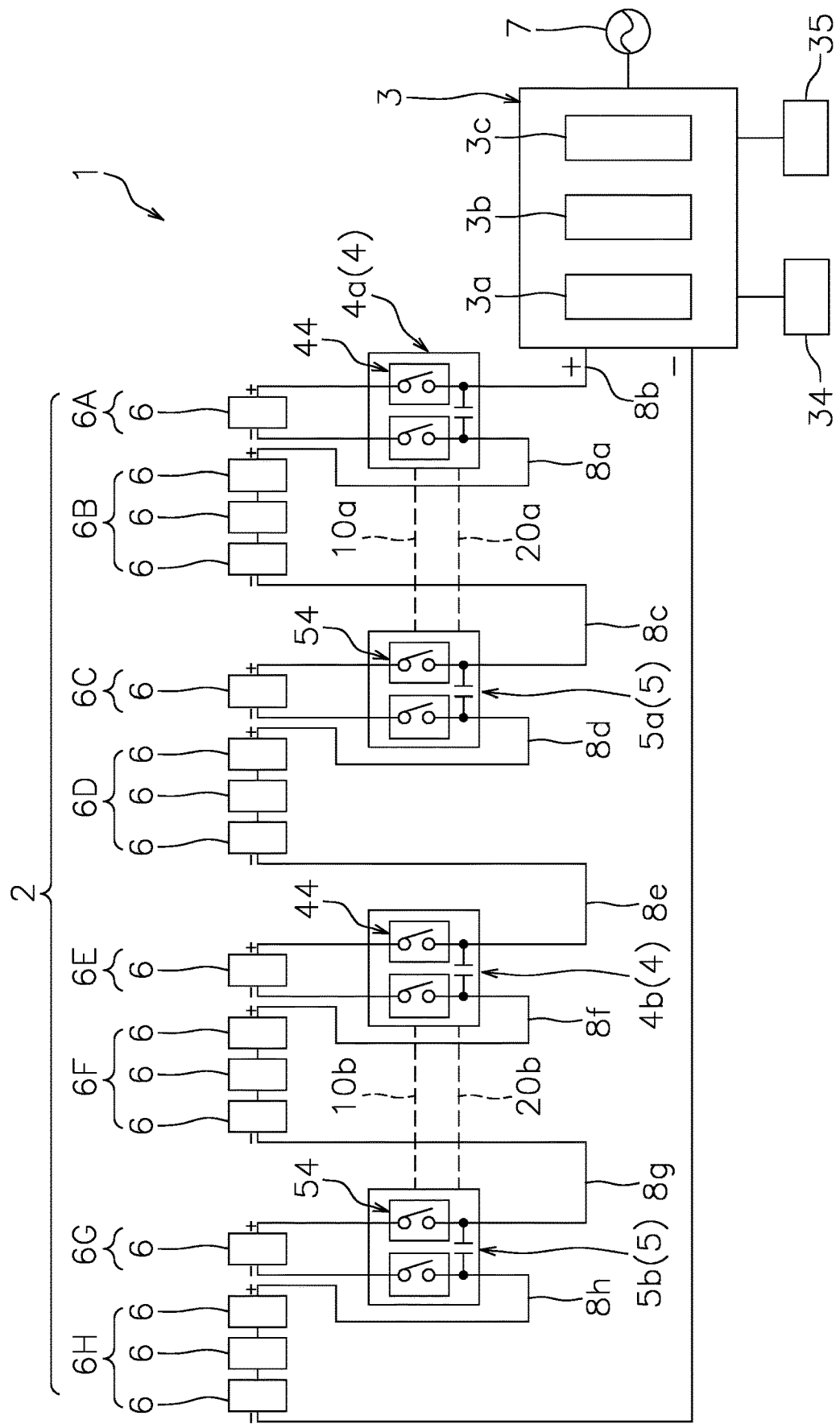
FIG. 9 is a block diagram schematically showing a configuration of a solar power generation system according to another embodiment.

In the above embodiment, each of the relays 44 of the first shut-off devices 4a and 4b have two contacts of the first open-close unit 44a and the second open-close unit 44b, but as shown in FIG. 9, each of the relays 44 may be two relays having a single contact. That is, the control unit 43 of the first shut-off device 4a may be configured to independently control the opening and closing of the first open-close unit 44a and the second open-close unit 44b of the first shut-off device 4a. The control unit 43 of the first shut-off device 4b may be configured to independently control the opening and closing of the first open-close unit 44a and the second open-close unit 44b of the first shut-off device 4b. Similarly, in the second shut-off devices 5a and 5b also, the control unit 53 may be configured to be able to independently control the third open-close unit 54a and the fourth open-close unit 54b of the relay 54.

In the above embodiment, the first shut-off device 4a is connected to the electric path 8a connecting the group 6A and the group 6B and the electric path 8b connecting the inverter 3 and the group 6A. However, the arrangement of the first shut-off device 4a may be exchanged with that of the second shut-off device 5b. For example, the first shut-off device 4a may be connected to the electric path 8c and the electric path 8d, and the second shut-off device 5a may be connected to the electric path 8a and the electric path 8b.

In the above embodiment, the first control signal from the inverter 3 is output to the first shut-off devices 4a and 4b by power line communication, but as shown in FIG. 7, the first control signal may be output to the first shut-off devices 4a and 4b by wireless communication such as Wi-Fi®. Alternatively, the inverter 3 and the first shut-off devices 4a and 4b may be configured to be in communication with each other by wireless communication. For example, the first shut-off devices 4a and 4b may output the abnormal signal to the inverter 3 by wireless communication. Alternatively, the first shut-off device 4a and 4b may be configured to output the abnormal signal to a user's mobile terminal by wireless communication.

In the above embodiment, the first shut-off device 4a determines that the second shut-off device 5a is abnormal when there is no feedback from the second shut-off device 5a. However, the determination of whether or not the second shut-off device 5a is abnormal by the first shut-off device 4a is not limited to the above embodiment. For example, the first shut-off device 4a may be configured to periodically communicate with the second shut-off device 5a, and when there is no communication response from the second shut-off device 5a (when the periodic communication is interrupted), the first shut-off device 4a may determine that the second shut-off device 5a is abnormal. Similarly, the first shut-off device 4b may determine that the second shut-off device 5b is abnormal when there is no communication response from the second shut-off device 5b.

The state signals output from the second shut-off devices 5a and 5b are not limited to the above embodiment. The state signals output from the second shut-off devices 5a and 5b may include at least one of information about the voltage of the second shut-off devices 5a and 5b, current of the second shut-off devices 5a and 5b, or an opened or closed state of the relay 54. The first shut-off device 4a may determine that the second shut-off device 5a is abnormal based on the information about the opened or closed state of the relay 54 of the second shut-off device 5a, or may determine that the second shut-off device 5a is abnormal by monitoring the voltage between the contacts of relay 54 of the second shut-off device 5a based on the state signal output from the second shut-off device 5a to detect welding of relay 54 of the second shut-off device 5a. Similarly, the first shut-off device 4b may determine that the second shut-off device 5b is abnormal based on the information about the opened or closed state of the relay 54 of the second shut-off device 5b.

The second shut-off devices 5a may be connected to the first shut-off device 4a via two communication lines. That is, the second shut-off device 5a may be configured to be able to communicate with the first shut-off device 4a at all times. Similarly, the second shut-off device 5b may be configured to be able to communicate with the first shut-off device 4b at all times.

The first shut-off device 4 may output the state signal to the inverter 3 via power line communication or wireless communication. The inverter 3 may monitor the first shut-off device 4 based on the state signal output from the first shut-off device 4. When the inverter 3 determines that the first shut-off device 4 is abnormal depending on the state signal output from the first shut-off device 4, the inverter 3 may output an abnormal signal to the display unit 34 or the user's mobile terminal to report that the first shut-off device 4 is abnormal. The state signal output from the first shut-off device 4 may be the same information as the state signals output from the second shut-off device 5. The state signal output from the first shut-off device 4 may be, for example, feedback to the inverter in response to the first shut-off device 4 outputting the command signal to the relay 44 in response to the first control signal, may include at least one of information about the voltage of the first shut-off device 4, current of the first shut-off device 4, or an opened or closed state of the relay 44, or may include information indicating that the first shut-off device 4 is abnormal.

The number of the first shut-off device or the second shut-off device is not limited to the above embodiment. Further, in the above embodiment, one second shut-off device 5 is provided for one first shut-off device 4, but a plurality of second shut-off devices 5 may be provided for one first shut-off device 4. In this case, power is supplied from one first shut-off device 4 to a plurality of second shut-off devices 5.

REFERENCE NUMERALS

1 Solar power generation system
2 String
3 Inverter
4 First shut-off device
5 Second shut-off device
6 Solar cell module
6A to 6H Solar cell module groups
54 Relay (An example of open-close unit)

The invention claimed is:

1. A solar power generation system, comprising:
a string including a plurality of solar cell module groups connected in series with each other, the solar cell module groups each including one or a plurality of solar cell modules connected in series;
an inverter connected to the string and configured to convert DC power output from the string to AC power;
a first shut-off device connected to a first electric path connecting between the plurality of solar cell module groups; and
a second shut-off device connected to a second electric path connecting between the plurality of solar cell module groups different from the plurality of solar cell module groups connected to the first electric path, wherein
the plurality of solar cell module groups in the string each have an open circuit voltage equal to or less than a predetermined open circuit voltage,
the first shut-off device is connected to a power line connected to the second shut-off device, the first shut-off device configured to cut off a connection between the plurality of solar cell module groups connected to the first electric path in response to a first control signal from the inverter, and
the second shut-off device is connected to the first shut-off device in a two-way communicable manner, the second shut-off device being driven by an electrical power supplied from the first shut-off device via the power line, the second shut-off device configured to cut off a connection between the plurality of solar cell module groups connected to the second electric path in response to a second, direct control signal from the first shut-off device.

2. The solar power generation system according to claim 1, wherein the first shut-off device is configured to monitor the second shut-off device based on a second state signal output from the second shut-off device.

3. The solar power generation system according to claim 2, wherein when the first shut-off device determines that the second shut-off device is abnormal depending on the second state signal, the first shut-off device outputs an abnormal signal.

4. The solar power generation system according to claim 3, wherein when the first shut-off device detects that output of the second state signal is stopped, the first shut-off device determines that the second shut-off device is abnormal.

5. The solar power generation system according to claim 2, wherein the second shut-off device is connected to the first shut-off device with a single communication line.

6. The solar power generation system according to claim 2, wherein the second shut-off device includes an open-close unit, the open-close unit configured to open and close the connection between the plurality of solar cell module groups connected to the second electric path, and
the second state signal includes information about an opened or closed state of the open-close unit.

7. The solar power generation system according to claim 1, wherein the inverter is configured to monitor the first shut-off device based on a first state signal output from the first shut-off device.

8. The solar power generation system according to claim 7, wherein when the inverter determines that the first shut-off device is abnormal depending on the first state signal, the inverter outputs an abnormal signal.

9. The solar power generation system according to claim 1, wherein the first shut-off device cuts off the connection between the plurality of solar cell module groups connected to the first electric path in response to the first control signal from the inverter, and then outputs the second, direct control signal to the second shut-off device.

10. The solar power generation system according to claim 1, wherein the first shut-off device outputs the second, direct control signal to the second shut-off device by a communication system different from power line communication.

11. The solar power generation system according to claim 1, wherein the open circuit voltage of each of the plurality of solar cell module groups in the string is 165 V or less.

12. The solar power generation system according to claim 1, wherein the plurality of solar cell module groups in the string includes a first group, and
the first shut-off device is driven by an electrical power generated by one or a plurality of solar cell modules connected in series belonging to the first group.

13. The solar power generation system according to claim 1, wherein the inverter is configured to output the first control signal to the first shut-off device by power line communication.

14. The solar power generation system according to claim 1, wherein the inverter is configured to output the first control signal to the first shut-off device by wireless communication.

15. The solar power generation system according to claim 1, wherein at least one of the plurality of solar cell module groups in the string includes a plurality of solar cell modules connected in series.

16. The solar power generation system according to claim 1, wherein the first shut-off device includes a first bypass diode connected in parallel with one of the plurality of solar cell module groups.

17. The solar power generation system according to claim 1, wherein the second shut-off device includes a second bypass diode connected in parallel with one of the plurality of solar cell module groups.

* * * * *